(12) United States Patent
Hirose et al.

(10) Patent No.: US 6,669,412 B1
(45) Date of Patent: Dec. 30, 2003

(54) CUTTING INSERT

(75) Inventors: Takeshi Hirose, Ishige-machi (JP);
Yoshihiro Kitagawa, Ishige-machi (JP);
Ken Hasegawa, Ishige-machi (JP);
Yuuichi Suzuki, Ishige-machi (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/613,689

(22) Filed: Jul. 10, 2000

(30) Foreign Application Priority Data

Jul. 9, 1999 (JP) .......................... 11-196794
May 12, 2000 (JP) ...................... 2000-140972

(51) Int. Cl.⁷ .................... B23C 5/20; B23D 27/22
(52) U.S. Cl. .................. 407/113; 407/114; 407/116
(58) Field of Search ................. 407/113, 114, 407/115, 116

(56) References Cited

U.S. PATENT DOCUMENTS

| | | | | |
|---|---|---|---|---|
| 3,866,282 A | * | 2/1975 | Lundgren | 29/95 |
| 4,776,732 A | | 10/1988 | Hale | |
| 4,808,045 A | | 2/1989 | Tsujimura et al. | |
| 4,893,969 A | * | 1/1990 | Hessman et al. | 407/114 |
| 5,052,863 A | * | 10/1991 | Satran | 407/113 |
| 5,071,292 A | * | 12/1991 | Satran | 407/116 |
| 5,145,295 A | * | 9/1992 | Satran | 407/113 |
| 5,256,009 A | | 10/1993 | Stoffels | |
| 5,388,932 A | | 2/1995 | DeRoche et al. | |
| 5,718,540 A | * | 2/1998 | Satran et al. | 407/42 |
| 5,720,583 A | | 2/1998 | Bohnet et al. | |
| 5,810,521 A | * | 9/1998 | Pantzar et al. | 407/114 |
| 5,876,154 A | | 3/1999 | Enderle | |
| 5,957,629 A | * | 9/1999 | Hessman et al. | 407/113 |
| 5,971,672 A | * | 10/1999 | Hansson | 407/114 |
| 6,039,515 A | * | 3/2000 | Lamberg | 408/188 |
| 6,142,716 A | * | 11/2000 | Jordberg et al. | 407/114 |

FOREIGN PATENT DOCUMENTS

| | | |
|---|---|---|
| EP | 0 404 744 A2 | 12/1990 |
| JP | 62-208817 | * 9/1987 |
| JP | 7-136825 | 5/1995 |
| JP | 7-178606 | 7/1995 |
| JP | 9-207007 | 8/1997 |

OTHER PUBLICATIONS

Drozda et al., "Tool and Manufacturing Engineers Handbook", Page No. 1–10, Foruth Edition, vol. 1, 1983.*

* cited by examiner

*Primary Examiner*—Henry W. H. Tsai
(74) *Attorney, Agent, or Firm*—Oblon, Spivak, McClelland, Maier & Neustadt, P.C.

(57) ABSTRACT

A cutting insert including a main cutting tooth, a sub cutting tooth and a corner tooth. The main cutting tooth has a honing angle $\alpha$, and the sub cutting tooth has a honing angle $\beta$. The corner tooth connects the main cutting tooth and the sub cutting tooth, and has honing angles including a maximum honing angle $\gamma 1$. The honing angles $\alpha$, $\beta$ and $\gamma 1$ are inclination angles of the main cutting tooth, sub cutting tooth and a corner tooth, respectively. The honing angle $\alpha$ is larger than the honing angle $\beta$ and smaller than the maximum honing angle $\gamma 1$.

12 Claims, 4 Drawing Sheets

(a)

(b)

(c)

Fig,6
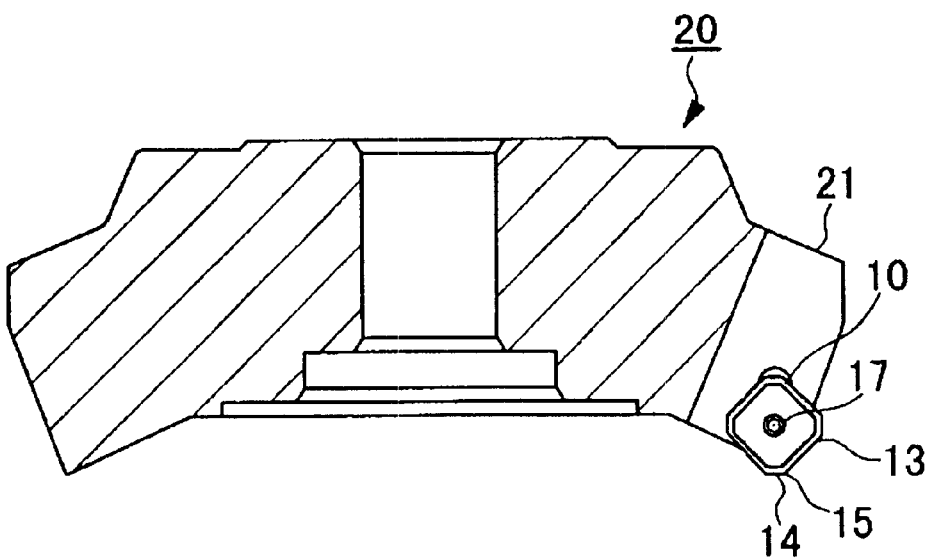

CUTTING INSERT

CROSS-REFERENCE TO RELATED APPLICATIONS

The present application claims priority under 35 U.S.C. §119 to Japanese Patent Application No. H11-196794, filed Jul. 9, 1999. The contents of that application are incorporated herein by reference in their entirety.

BACKGROUND OF THE INVENTION

1. Field of the Invention

This invention relates to the cutting insert for intermittent cutting which is used in milling tools such as face milling cutters, end-mills and others.

2. Description of the Background

FIG. 4 is the front view of a cutting insert as one example of the conventional technology. FIG. 5 is the cross sectional view along the X—X line of the cutting insert shown in FIG. 4.

FIG. 6 is the central sectional view of a face milling cutter equipped with the cutting insert shown in FIG. 4. As shown in FIG. 4, this cutting insert is formed in the shape of an approximately square shape (FIG. 4 is approximately square shape) board type and has an under surface 11 which makes a taking a seat side, and an upper face 12 which counters the under surface 11. A main cutting tooth 13 is formed in a ridge line portion which extends approximately to the neighborhood of the upper surface 12, an approximately straight line sub cutting tooth 14 is formed between two main cutting teeth 13, 13 by which it is formed, respectively, and the circular corner tooth 15 is formed between the main cutting tooth 13 and the sub cutting tooth 14, and a circular corner tooth connects both of the cutting teeth 13, 14 smoothly. A side face 16 which is formed between the under surface 11 and the upper surface 12 inclines outside towards a field 12 and forms a positive insert as shown in FIG. 5.

The upper surface 12 is made into a rake face, and the side face 16 is made into a flank face.

Moreover, a central portion of the upper surface 12 and the under surface 11 is penetrated, and the penetrations for screw penetration is formed.

A ridge line portion which makes approximately four rounds of the upper surface 12 is given a honing (honing surface) 18 as shown in FIG. 4 and FIG. 5. That is, an intersection ridge line portion of the honing 18 and the side face 16 make up the main cutting tooth 13, the sub cutting tooth 14 and the corner tooth 15. The section of this honing 18 which intersects perpendicularly with a ridge line portion may be made into a straight line, and it may extend from this honing 18 toward the outside of the cutting insert 10 to a level surface. The inclination angle (honing angle) θ may be set constant.

The upper surface 12 of the cutting insert 10 consists of an upper surface inclination portion 12A which inclined so that a honing 18 may be intersected, it may extend to the level surface towards the central portion of the cutting insert 10 and become a slope, and an upper surface level part 12B which is connected to this upper surface inclination part 12A, and is leveled in near the central portion of the cutting insert 10. In addition, the connection between upper surface inclination part 12A and the upper surface level part 12B is smoothed.

As shown in FIG. 6, This cutting insert 10 is provided in a tip perimeter of a main cutter body 21 in a milling cutter 20, for instance , and a part of work material is intermittently cut off by carrying out rotation cutting of the main cutter body 21 to the work material.

The cutting insert 10 is disposed so that the main cutting tooth 13 may project toward the perimeter side of the main cutter body 21, and also that sub cutting tooth 14 may turn onto a down tooth of the main cutter body 21. In case of rotation cutting of the work material by the face milling cutter 20, main cutting is performed by the main cutting tooth 13, and finish cutting is performed by the sub cutting tooth 14.

Although the main cutting tooth 13 and the sub cutting tooth 14 is connected smoothly by circular corner tooth 15 in above mentioned cutting insert 10, the problem of being easy to break out in corner tooth 15 by the shocks at the time of the instruction to which each cutting tooth 13, 14, 15 begin to hit to the work material at the time of cutting.

Moreover, the corner tooth 15 in a center side of rotation such as face milling cutter and end mill etc., bites the chips generated by cutting of the sub cutting tooth 14, as the results, the finished surface is damaged, moreover, as the results of the crush the chip into above mentioned corner tooth 15, the corner tooth 15 will be broken.

Furthermore, when the vibration of the work material propagate to the corner tooth 15 at the time of cutting, there was also a problem that the corner tooth 15 will be broken.

Also, the corner tooth 15 located toward the center of rotation in face milling cutters, end mills and others bites the chips generated by the sub cutting tooth 14 during cutting. As a result, a finished surface is damaged and the corner tooth 15 is damaged as well because of the chips crushing into it.

Furthermore, when the vibration of a work material during cutting is transmitted to the corner tooth 15, the corner tooth 15 can break.

SUMMARY OF THE INVENTION

In view of the above, this invention aims to offer the cutting insert which is possible to increase the break resistant property of the corner portion near the intersection part of the main cutting tooth and the sub cutting tooth for cutting.

To attain the above mentioned object, a cutting insert according to this invention includes a main cutting tooth having a honing angle α; a sub cutting tooth having a honing angle β; and a corner tooth connecting said main cutting tooth and said sub cutting tooth and having a honing angle γ, wherein said honing angle α is larger than said honing angle β and said honing angle γ.

In the cutting insert mentioned above, since the honing angle over a corner edge is enlarged compared with the honing angle over the main cutting tooth and sub cutting tooth, the break resistance of the corner tooth is increased from easily breaking, therefore, the corner tooth is prevented from easily breaking from the shock exerted on when cutting begins. Since a honing angle is enlarged only against the corner tooth, the sharpness of the main cutting tooth and the sub cutting tooth is not reduced.

Furthermore, another cutting insert according to the present invention includes a corner tooth having a height from an under face which makes the seat face of the corner tooth being lower than a height of a sub cutting tooth.

Since the height from the under face of the corner tooth is lower than the height of a sub cutting tooth in the cutting insert mentioned above, a corner tooth is in a lower position than a sub cutting tooth with respect to a rotational direction of a face milling cutter, an end mill or others. Hence, when the chips generated by a sub cutting tooth during cutting drift toward the center of their rotation, the corner tooth is prevented from biting the chips by the side of a rotation center or breaking by the crash of the chips into the corner tooth.

Moreover, because there is a very small clearance between the corner tooth used for cutting and a work material, when the vibration of the work material is transmitted to the corner tooth during cutting, the corner tooth is prevented from breaking.

Furthermore, still another cutting insert according to the present invention includes the honing angle α in a range of 0°<α<60°, the honing angle β in a range of 0°<β<60°, and the honing angle γ in a range of 5°<γ<80°.

In the above mentioned cutting insert, if the honing angle α of the main cutting tooth is less than 0°, the effect of forming the honing face i.e., the break resistant property of the main cutting tooth cannot be increased, and if it is 60° or more, the sharpness of the main cutting tooth is reduced.

Similarly, if the honing angle β of the sub cutting tooth is less than 0°, the break resistant property of the sub cutting tooth cannot be increased, and if it is 60° or more, the sharpness of the sub cutting tooth is reduced. Furthermore, if the honing angle γ of the corner tooth is less than 5°, the break resistant property of a corner tooth cannot be increased, and if it is 80° or more, the sharpness of a corner tooth is reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is the central sectional view of a face milling cutter equipped with the cutting insert shown in FIG. 4.

DETAILED DESCRIPTION OF THE PREFERRED EMBODIMENTS

Figure 1:
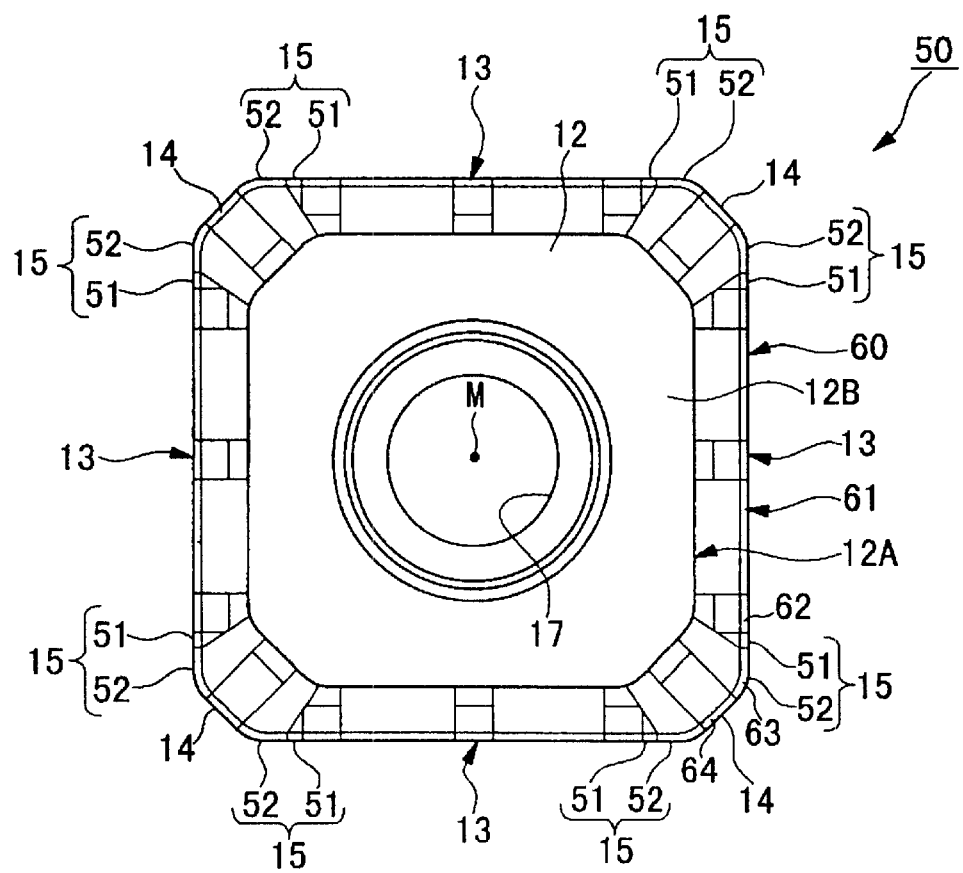
FIG. 1 is the front view of a cutting insert according to this invention.

The preferred embodiments will now be described with reference to the accompanying drawings, wherein like reference numerals designate identical or corresponding elements throughout the various drawings.

Figure 2:
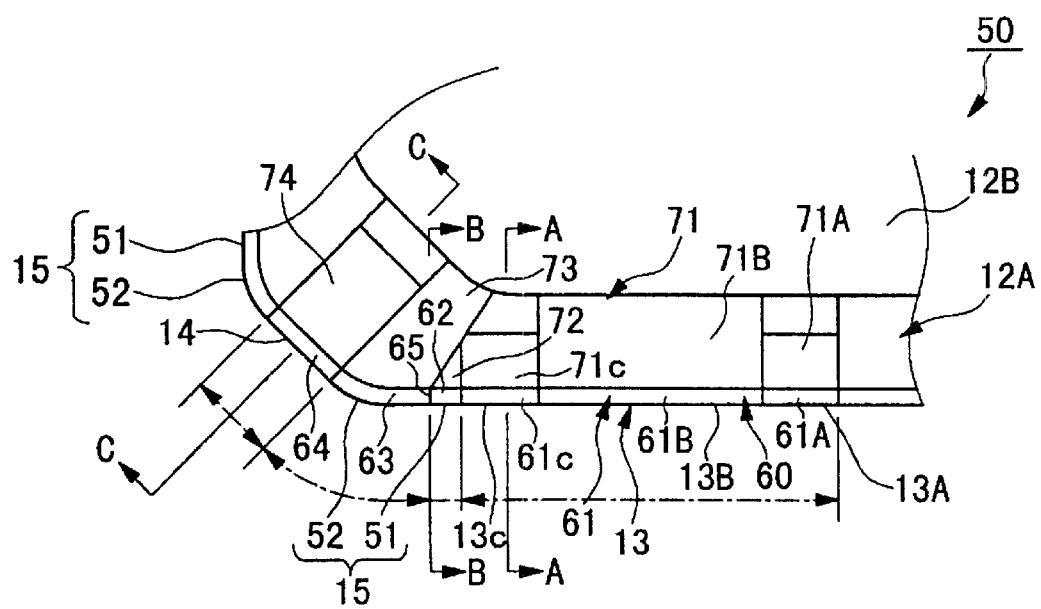
FIG. 2 is an enlarged front view of a principal portion of the cutting insert shown in FIG. 1.
Figure 3:
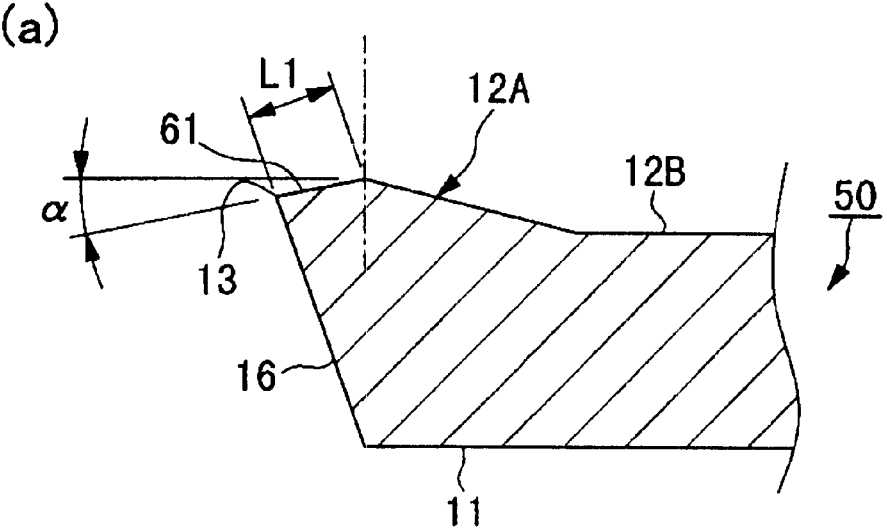
FIGS. 3(a), 3(b) and 3(c) are the A—A line cross sectional view, the B—B line cross sectional view and the C—C line cross sectional view of the cutting insert shown in FIG. 2, respectively.
Figure 3:
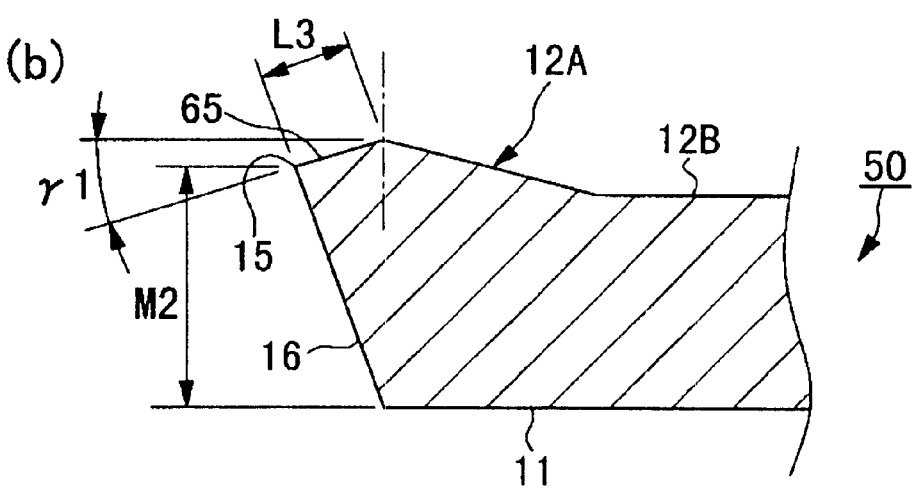
Figure 3:
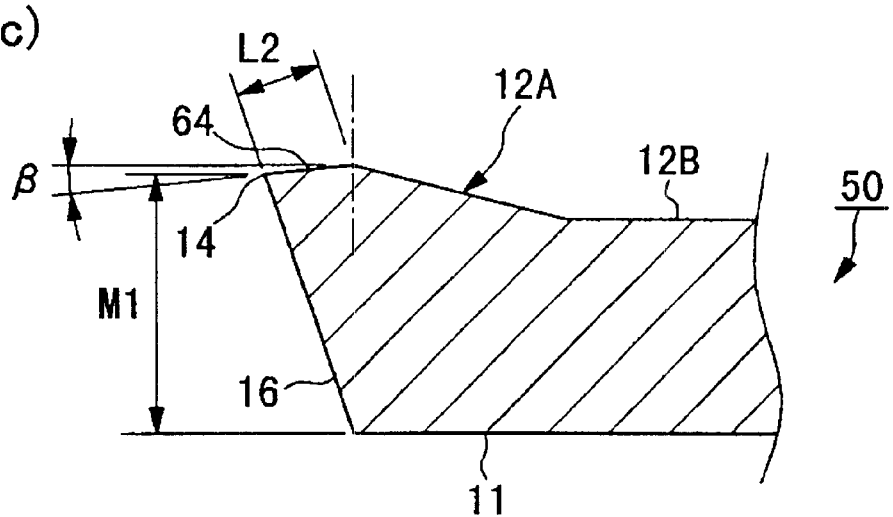

FIG. 1 is a front view of a cutting insert by one practical form in this invention. FIG. 2 is an enlarged front view of a principle portion of the cutting insert shown in FIG. 1. FIG. 3(a) is a cross sectional view along the A—A line of the cutting insert shown in FIG. 2 and FIG. 3(b) is a cross sectional view along the B—B line of the cutting insert shown in FIG. 2 and FIG. 3(c) is a cross sectional view along the B—B line of the cutting insert shown in FIG. 2.

In addition, the same mark is allotted to the same portion as the conventional technology mentioned above.

The cutting insert 50 by this example is formed in the shape of an approximately quadrangle plank (approximately square shape in FIG. 1) which was made symmetrical to the central axis M, and the insert is formed as the positive insert which the side face 16 made into a flank face inclines outside toward the upper face 12. The upper face 12 forms a rake face from the under face 11 which forms the seat face of the cutting insert 50. As shown in FIG. 1, the main cutting tooth 13 is formed in the portion of the ridge line which forms approximately four faces of the quadrangle respectively of the upper face 12, and the approximately straight line like the sub cutting tooth 14 formed between the two main cutting teeth 13, 13 which carry out an approximately rectangular cross and adjoins, and an approximately circular corner tooth which connects the main cutting tooth 13 and the sub cutting tooth 14 to the both sides is formed respectively.

The corner tooth is formed from both the 1st corner tooth of an approximately straight line like in a plane view from the main cutting tooth 13 side toward the sub cutting tooth 14 side and an approximately circular 2nd corner tooth 52, and the connection between each tooth 13, 51, 52, 14 is smoothed.

A honing 60 (honing face) is provided around the circumferences of the ridge line part which makes approximately four rounds of the upper face 12. The honing 60 includes the 1st honing 61, the 2nd honing 62, the 3rd honing 63, and the 4th honing 64 in order toward the sub cutting tooth 14 from the main cutting tooth 13 corresponding to each tooth 13, 14, 51, 52 formed in the intersection ridge line portion of the honing 60 and the side face 16, as shown in FIG. 2.

The honing 60 inclines such that it may get down to the level surface and become a slope, and the 1st honing angle α (for example, 12°) of the 1st honing 61 by which the perimeter side shown in FIG. 3(a) makes the main cutting tooth 13 is made larger than the 2nd honing angle β (for example 8°) of the 4th honing 64 by which the perimeter side shown in FIG. 3(c) makes the sub cutting tooth 14 (α>β).

Furthermore, as shown in FIG. 3(b), the maximum 3rd honing angle γ1 (for example, 20°) in the intersection portion 65 of the 2nd honing 62 and the 3rd honing 63 is made larger than the 1st honing angle α (γ1>α>β). The honing angle of the intersection ridge line portion of the 1st honing 61 and the 2nd honing 62 is made equal to the 1st honing angle α, the honing angle of the 2nd honing 62, namely, the honing angles of the corner tooth is set up so that it becomes gradually larger to the maximum 3rd honing angle γ1 as it extends to the intersection portion 65 on the left side in FIG. 2.

On the other hand, the honing angle of intersection ridge line portion of the 3rd honing 63 and the 4th honing 64 is made equal to the 2nd honing angle β, and the honing angle of the 3rd honing 63, namely, the honing angles of the corner tooth 15 is set up so that it may become gradually smaller to the 2nd honing angle from the 3rd honing angle γ1, according to the 4th honing 64 from intersection portion 65 (to left upper side, in FIG. 2).

That is, the 1st corner tooth 51 formed in the intersection ridge line portion of the 2nd honing 62 and the side face 16 inclines so as to get a slope down from the main cutting tooth toward the intersection portion 65, and the 2nd corner tooth 52 formed in the intersection ridge line portion of the 3rd honing 63 and the side face 16 inclines so as to get a slope down from the sub cutting tooth 14 toward the intersection portion 65.

The 1st corner tooth and 2nd corner tooth 51, 52 are formed so as to form a smooth convex curve toward the under face 11 on the whole, and preferably, formed that the corner in the plane view may almost approach to the under face, namely, the honing angles of the corner tooth 15 approach the maximum value (the maximum 3rd honing angle γ1). If the honing angles of the corner tooth 15 is less than the 1st honing angle α, the effect of increasing the break resistant property of the corner tooth 15 cannot be obtained. Moreover, the 1st honing angle α is set in the range of $0° < α < 60°$, or preferably, $0° < α \leq 45°$.

If the 1st honing angle α is less than 0°, the effect of giving the honing 60 the break resistant property of the main cutting tooth 13 cannot be increased, and if it is 60° or more, the sharpness of the main cutting tooth 13 will be reduced.

Moreover, the 2nd honing angle β is set in the range of $0° < β < 60°$ or preferably, $0° < β \leq 45°$. If the honing angle β is less than 0°, the break resistant property of the sub cutting tooth 14 cannot be increased, and if it is 60' or more, the sharpness of the sub cutting tooth 14 will be reduced.

Furthermore, the honing angles of the corner tooth 15 are set in the range of $5° < γ < 80°$. If the honing angles of the corner tooth 15 are less than 5°, the break resistant property of the corner tooth 15 cannot be increased, and if it is 80° or more, the sharpness of the corner tooth 15 will be reduced.

In addition, as shown in FIGS. 3(a), 3(b), and 3(c), the section which the honing 60 intersects perpendicularly with the ridge line portion with the side face 16 is made into the shape of the straight line for example, and the length of this straight line is the width of honing. For example, the 1st honing width L1 of the honing 61 is made longer than the 2nd honing width L2 of the 4th honing 64 (L1>L2), and the honing width 13 of the intersection portion 65 is made longer than the 1st honing width L1 (L3>L1>L2). The honing width of the 2nd honing 61 is enlarged from 1st honing width L1 to the 3rd honing width 13, toward the intersection portion 65 from the 1st honing 61, and the honing width of the 3rd honing 63 is made small from the 3rd honing width 13 to the 2nd honing width L2, toward the 4th honing 64 from the intersection portion 65. Furthermore, a respective honing width of each honing 61A, 61B, 61C of the main cutting tooth which constitutes the 1st honing 61 is made equal to the 1st honing width L1 and set constant.

Moreover, the height M2 from the under face 11 which makes the seat face of the corner tooth 15 is made shorter than the height M1 from the under face 11 of the sub cutting tooth 14 (M1>M2).

As shown in FIG. 2, an upper inclination portion 12A of the cutting insert 50 which intersect with the honing 60 includes a 1st upper face inclination portion 71 and a 2nd upper face inclination portion 72 and a 3rd upper face inclination portion 73 and a 4th upper face inclination portion 74 which intersect with their respective honings 61, 62, 63, 64. Furthermore, the 1st upper face inclination portion 71 includes a 1st main cutting tooth inclination portion 71A and a 2nd main cutting tooth inclination portion 71B and a 3rd main cutting tooth inclination portion 71C which connect to their respective honings 61A, 61B, 61C of the main cutting tooth.

Figure 4:
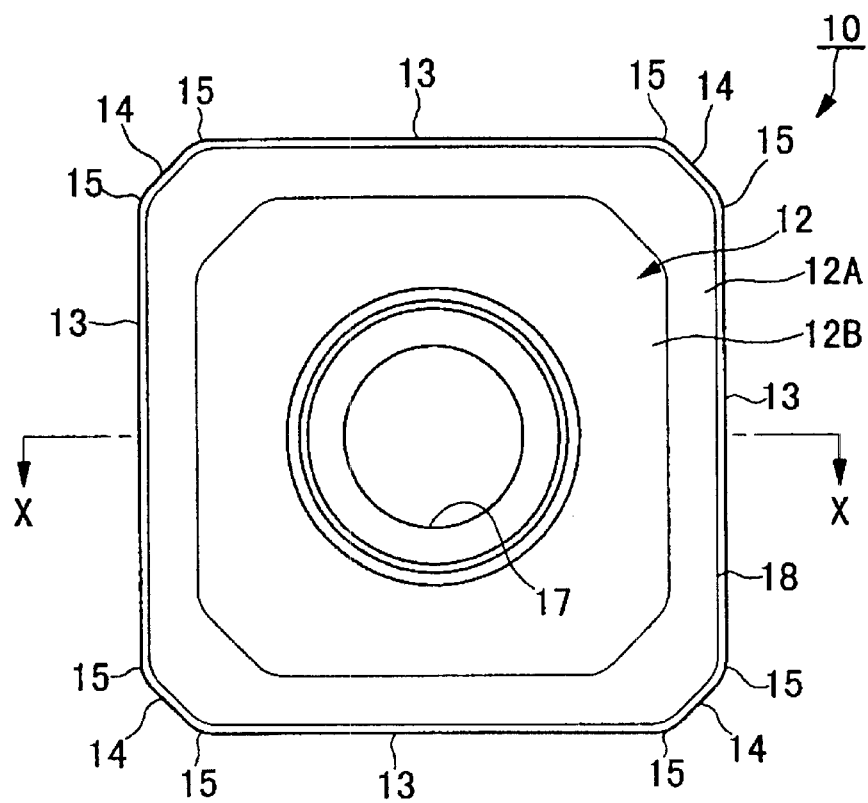
FIG. 4 is a front view of a conventional cutting insert.
Figure 5:
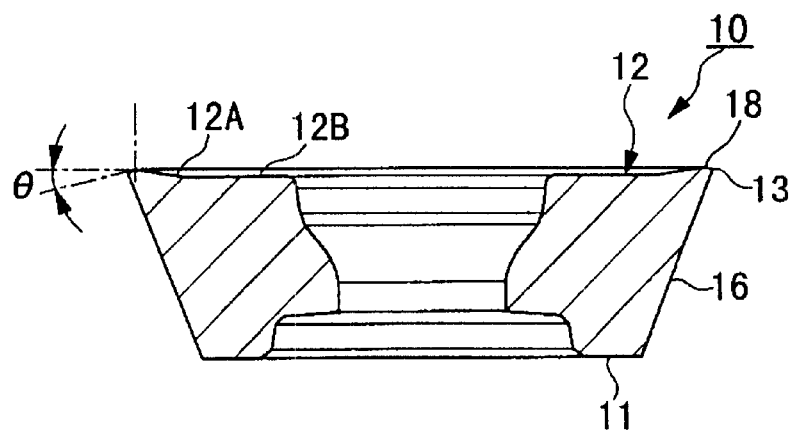
FIG. 5 is the X—X line cross sectional view of the cutting insert shown in FIG. 4.

Each inclination portion 71A, 71B, 71C of the main cutting tooth is formed as the flat face, for example. In FIG. 2 and FIG. 4, a 1st intersection ridge line 75 is located in a lower portion in a perpendicular direction than a 3rd intersection ridge line 76 where the 3rd main cutting tooth inclination portion 71C meets the 3rd main cutting tooth honing 61C. The 2nd upper face inclination portion 72 and the 4th upper face inclination portion 74 is formed to flat face, for example, and these upper face inclination portions 72, 74 are connected smoothly by the 3rd upper face inclination portion 73 which is primarily concave.

Each upper face inclination portion 71, 72, 73, 74 is connected smoothly with an upper face leveled portion 12B near the central portion of the cutting insert 50. As mentioned above, according to the cutting insert 50 of this example, the 1st honing angle α of the 1st honing 61 is made larger than the 2nd honing angle β of the 4th honing 64 in which the perimeter side is the sub cutting tooth 14(α>β), the maximum 3rd honing angle γ1 in the intersection portion 65 of the 2nd honing 62 and the 3rd honing 63 is further made larger than the 1st honing angle α, and the honing angles of the corner tooth 15 are made gradually larger than the 1st honing angle α. Therefore, it is possible to increase the break resistant property of the corner tooth 15 without decreasing the sharpness of the sub cutting tooth 14 which performs finish cutting. For example, when the cutting insert bites into a work material, it is possible to reduce the breakage on the edge of the corner tooth 15 caused by the shock to the edge of the cutting tooth.

Furthermore, since the height M2 from the under face 11 which makes the seat face of the corner tooth 15 is shorter than the height M1 of a sub cutting tooth, the corner tooth 15 falls back behind the sub cutting tooth 14 in the rotating direction of a face milling cutter and others. Hence, when the chips generated by the sub cutting tooth 14 during cutting drift toward the center of the rotation, the corner tooth 15 is prevented from biting the chips by the side of a rotation center.

Moreover, the chips does not crash into the corner tooth 15 and thus the corner tooth 15 is prevented from breaking.

Also, because there is a very small clearance between the corner tooth 15 used for cutting and a work material, when the vibration of the work material is transmitted to the corner tooth during cutting, the corner tooth 15 is prevented from breaking.

Furthermore, the 1st honing angle α is set in the range of $0° < α < 60°$. If the 1st honing angle α is less than 0°, the effect of the honing 60, namely, the improvement of the break resistant property of the main cutting tooth 13 cannot be obtained. Conversely, if it is 60° or more, the sharpness of the main cutting tooth 13 will decrease. Similarly, the 2nd honing angle β is set in the range of $0° < β < 60°$. If the 2nd honing angle is less than 0°, the improvement of the break resistant property of the sub cutting tooth 14 cannot be expected. Conversely, if it is 60° or more, the sharpness of the sub cutting tooth 14 will decrease. Furthermore, the honing angles of the corner tooth 15 are set in the range of 5° to 80°. If the honing angles of the corner tooth 15 are less than 5°, the improvement of the corner tooth 15 cannot be expected. Conversely, if they are 80° or more, the sharpness of the corner tooth will decrease. In addition, in this example, the 1st honing angle α of the 1st honing 61 whose perimeter side is the main cutting tooth 13 is larger than the 2nd honing angle α of the 4th honing 64 whose perimeter side is the sub cutting tooth 14 (α>β). However, the present invention may not be limited to this example. The 1st honing angle α may be smaller than the 2nd honing angle β (α<β).

In short, the 1st honing angle α and the 2nd honing angle β should be just smaller than the honing angles of the corner tooth 15.

In addition, in this example, the 1st honing width L1 is made longer than the 2nd honing width L2 (L1>L2), the 3rd honing width 13 is made longer than the 1st honing width L1 (13>L1>L2), but it is not limited in this example. Each honing width L1, L2, 13 may be made equal (L1=L2=13), since the size relations between the honing widths do not matter. In addition, in this example, the 1st honing width L1 is made longer than the 2nd honing width L2 (L1>L2), the 3rd honing width 13 is made longer than the 1st honing width L1 (13>L1>L2), but it is not limited to this example. The honing width L1, L2, and 13 may be made equal (L1=L2=13), since other size relations are also permitted. In short, the size relation of each honing width L1, L2, and 13 is not particularly limited. Moreover, the honing 60 may be fabricated by machining, formed by molding or any other methods. Moreover, the tip of the honing 60 may be formed so that it may have proper curvature in a cross sectional view, and the honing 60 may be made into a double honing.

Moreover, in this example, although the cutting insert 50 considered as the shape of an approximately square plate, it may have the shape of the polygon board of a triangle or other forms without being limited to this square shape. Moreover, in this example, although the cutting insert 50 for a face milling cutter for shoulder cutting is explained, various cutting tools such as other milling tools, an end mill, for example, and lath cutting tools, a byte, may for example, also be equipped with a cutting insert of the present invention.

EXAMPLE

A cutting test of work materials was performed by using exemplary cutting inserts according to the present invention and exemplary conventional cutting inserts.

Testing conditions and the results are shown in Tables 1–4.

In Table 1, the widths L3 and L4 mean the 3rd and 4th honing widths L2 and L3 of the sub cutting tooth 14 and the corner tooth 15 in mm, respectively, the angles β and γ1 mean the 2nd and maximum 3rd honing angles β and γ1 of the sub cutting tooth 14 and the corner tooth 15, respectively, and also the heights M1 and M2 mean the heights of M1 and M2 from the under face 11 which makes the seat face of the sub cutting tooth 14 and the corner tooth 15 in mm, respectively.

The cutting test was examined for the exemplary cutting inserts 1 and 2 according to this invention and the exemplary conventional cutting inserts 1, 2 and 3 described in Table 1 by using a face milling cutter 20 as shown in FIG. 6.

A work material, SCM 440, of 190 mm in length was cut at a cutting speed, V, of 200 m/min, and the shock resistant property, the cutting resistance and the finished surface were examined for each of the cutting inserts described in Table 1.

In the shock resistant property test shown in Table 2, a strong intermittent cutting test of the work material at a cutting depth of ap=2.5 mm was examined twice at various feed rates f (mm/tooth) for each of the cutting inserts in Table 1.

The unit of this feed rate f is the advance speed per one tooth.

The numbers in Table 1 represent the cutting distances when their cutting teeth came to be broken, and ○ mark represent that the cutting teeth continued to cut for the full length without breaking.

In the cutting resistance and finished surface tests shown in Tables 3 and 4, respectively, the cutting inserts of Table 1 were examined under the conditions of the cutting depth of ap=2.0 mm and the feed rate of f=0.2 mm/tooth. They were compared for the cutting resistance about the main component force (N), the feeding component force (N) and the back component force (N), and finished surfaces were compared ten point average roughness Rz in pm along with the visual inspection.

Comparing the conventional cutting insert 1 with the cutting insert 1 of this invention in which the angle β of the sub cutting tooth is different and the height of the sub cutting tooth M1 is higher than the height of the corner tooth M2. Although the conventional cutting insert 1 was able to cut the 190 mm full length twice only for the feeding rate f=0.12 mm/tooth, the cutting insert 1 was able to cut up to the feeding rate of f=0.20 mm/tooth over the full length twice. In the cutting resistance test, smaller resistances were obtained for the cutting insert 1 according to this invention in the main component force, the feed component force and the back component force.

In the finished surface test, the surface roughness by the cutting insert 1 according to this invention is smaller than that of the conventional cutting insert 1, and the surface scratch by bite, etc., was not found on the finished surface by the cutting insert 1 according to this invention.

Next, the conventional cutting insert 2 was compared with the cutting insert 2 according to this invention. The cutting insert 2 had the widths L2 and L3 which were longer than those of the cutting insert 1. The angle γ1 of the corner tooth of the cutting insert 2 according to this invention is different from that of the conventional cutting insert 2, and in the cutting insert 2 according to this invention, the height of the corner tooth M2 was lower than the height of the sub cutting tooth M1.

In the shock resistant property test, the conventional cutting insert 2 was not able to cut the 190 mm full length at any feed rates f, whereas the cutting insert 2 was able to cut over the full length up to the feed rate of f=0.24 mm/tooth twice.

In the cutting resistance test, the conventional cutting insert 2 had smaller values than the cutting insert 2 in the main component force and the feed component force. However, the back component force of the cutting insert 2 according to this invention was smaller than that of the conventional cutting insert 2. In the finished surface test, the roughness of the finished surface by the cutting insert 2 of this invention was smaller than that of the conventional cutting insert 2, and also the surface scratch by bite, etc., was not found in the finished surface by the cutting insert 2 of this invention.

Moreover, when the conventional cutting insert 3 which enlarged the angles β and γ1, respectively, and made the heights M1 and M2 lower than those of the conventional cutting insert 2 was compared with the cutting insert 2 of this invention in the shock resistant property. Although the conventional cutting insert 3 was able to cut up to the feed rate of f=0.16 mm/tooth over the full length, the cutting insert 2 of this invention was superior than the conventional cutting insert 3. In the cutting resistance test, the cutting insert 2 of this invention had smaller value than the conventional cutting insert 3 in all of the main component force, the feed component force and the back component force.

Particularly, a remarkable effect was seen in the back component force. Regarding to the finished surface, the rough finished surface and the surface scratch by bite, etc., were seen in the conventional cutting insert 3, whereas the cutting insert 2 of this invention obtained the good results. Overall, the exemplary cutting inserts according to this invention controlled the cutting resistance and improved the shock resistant property and the surface roughness better than the conventional cutting inserts as shown in Tables 1–4.

TABLE 1

| | Sub cutting tooth portion | | | Corner tooth portion | | |
|---|---|---|---|---|---|---|
| | Width L2 | Angle β | Height M1 | Width L3 | Angle γ1 | Height M2 |
| Conventional Example 1 | 0.12 | −20 | 3.926 | 0.12 | −20 | 3.926 |
| Example 1 | 0.12 | −8 | 3.953 | 0.12 | −20 | 3.926 |
| Conventional Example 2 | 0.20 | −8 | 3.942 | 0.20 | −8 | 3.942 |
| Conventional Example 3 | 0.2 | −20 | 3.897 | 0.20 | −20 | 3.897 |
| Example 2 | 0.2 | −8 | 3.942 | 0.20 | −20 | 3.897 |

TABLE 2

Shock resistant property; W:SCM440, V = 200 m/min, ap = 2.5 mm, f = Var.

| | shock resistant property | | | | |
|---|---|---|---|---|---|
| | f = 0.12 | f = 0.16 | f = 0.20 | f = 0.24 | f = 0.28 |
| Conventional Example 1 | ○ | ○ | 42 | | |
| Example 1 | ○ | 155 | 40 | | |
| | ⊚ | ○ | ○ | 80 | |
| | ○ | ○ | ○ | 64 | |
| Conventional Example 2 | 14 | 42 | | | |
| | 19 | 40 | | | |
| Conventional Example 3 | ○ | ○ | ○ | 60 | |
| Example 2 | ○ | ○ | 170 | 80 | |
| | ○ | ○ | ○ | ○ | ○ |
| | ○ | ○ | ○ | ○ | 95 |

TABLE 3

Cutting resistance; W:SCM440, V = 200 m/min, ap = 2.0 mm, f = 0.2 mm/tooth

| | Cutting resistance | | |
|---|---|---|---|
| | Main component force | Feed component force | Back component force |
| Conventional Example 1 | 315 | 380 | 195 |
| Example 1 | 275 | 315 | 125 |
| Conventional Example 2 | 260 | 305 | 120 |
| Conventional Example 3 | 320 | 405 | 220 |
| Example 2 | 295 | 365 | 115 |

TABLE 4

Finished surface; W:SCM440, V = 200 m/min, ap = 2.0 mm, f = 0.2 mm/tooth

| | Finished surface | |
|---|---|---|
| | Rz | Visual |
| Conventional Example 1 | 7.5 | Scratch small |
| Example 1 | 4.2 | Scratch free |
| Conventional Example 2 | 8.2 | Scratch small |

TABLE 4-continued

Finished surface; W:SCM440, V = 200 m/min, ap = 2.0 mm, f = 0.2 mm/tooth

| | Finished surface | |
|---|---|---|
| | Rz | Visual |
| Conventional Example 3 | 13.5 | Scratch |
| Example 2 | 4.3 | Scratch free |

Obviously, numerous modifications and variations of the present invention are possible in light of the above teachings. It is therefore, to be understood that within the scope of the appended claims, the invention may be practiced otherwise than as specifically described herein.

What is claimed as new and desired to be secured by Letters Patent of the United States is:

1. A cutting insert comprising:
   a plurality of main cutting teeth each having a honing angle $\alpha$;
   a sub cutting tooth having a honing angle $\beta$; and
   a plurality of corner teeth connecting said plurality of main cutting teeth, respectively, and said sub cutting tooth, said plurality of corner teeth each having honing angles including a maximum honing angle $\gamma 1$,
   wherein:
      said honing angles $\alpha$, $\beta$ and $\gamma 1$ are angles measured for inclinations of said main cutting tooth, sub cutting tooth and corner tooth, respectively;
      said honing angle $\alpha$ is larger than said honing angle $\beta$ and smaller than said maximum honing angle $\gamma 1$; and
      said sub cutter tooth is positioned between two of said plurality of corner teeth.

2. The cutting insert of claim 1, wherein:
   said honing angle $\alpha$ is in a range of $0° < \alpha < 60°$;
   said honing angle $\beta$ is in a range of $0° < \beta < 60°$; and
   said honing angle $\gamma$ is in a range of $5° < \gamma < 80°$.

3. The cutting insert of claim 1, wherein:
   said cutting insert has a substantially square face having four side portions and four corner portions;
   said four side portions include said plurality of main cutting teeth at middle regions of at least two of said four side portions, respectively;
   said four corner portions include said sub cutting tooth at at least one of said four corner portions; and
   said plurality of corner teeth are provided adjacent to said sub cutting tooth, respectively.

4. A cutting insert having a seat face, comprising:
   a plurality of main cutting teeth;
   a sub cutting tooth; and
   a plurality of corner teeth connecting said plurality of main cutting teeth, respectively, and said sub cutting tooth,
   wherein:
      said plurality of corner teeth each have an outer edge whose height from the seat face is lower than a height of an outer edge of said sub cutting tooth from the seat face;
      said height of said outer edge of said sub cutting tooth is higher than a height of an outer edge of each of said plurality of main cutting teeth from the seat face; and
      said sub cutting tooth is positioned between two of said plurality of corner teeth.

5. The cutting insert of claim 4, wherein:

said cutting insert has a substantially square face having four side portions and four corner portions;

said four side portions include said plurality of main cutting teeth at middle regions of at least two of said four side portions, respectively;

said four corner portions include said sub cutting tooth at at least one of said four corner portions; and said plurality of corner teeth are provided adjacent to said sub cutting tooth, respectively.

6. A cutting insert comprising:

a plurality of main cutting teeth each having a honing angle $\alpha$;

a plurality of sub cutting teeth each having a honing angle $\beta$; and a plurality of corner teeth each having honing angles including a maximum honing angle $\gamma1$, each corner tooth of said plurality of corner teeth connecting a respective one of said plurality of main cutting teeth and a respective one of said sub cutting teeth, wherein:

said honing angles $\alpha$, $\beta$ and $\gamma1$ are angles measured for inclinations of said main cutting tooth, sub cutting tooth and corner tooth, respectively;

said honing angle $\alpha$ is larger than said honing angle $\beta$ and smaller than said maximum honing angle $\gamma1$; and each of said plurality of sub cutting teeth is positioned between two of said plurality of corner teeth.

7. The cutting insert of claim 6, wherein:

said honing angle $\alpha$ is in a range of $0°<\alpha<60°$;

said honing angle $\beta$ is in a range of $0°<\beta<60°$; and said honing angle $\gamma$ is in a range of $5°<\gamma<80°$.

8. The cutting insert of claim 6, wherein:

said cutting insert has a substantially square face having four side portions and four corner portions;

said four side portions include at least one main cutting tooth of said plurality of main cutting teeth at a middle region of each one of said four side portions;

said four corner portions include at least one sub cutting tooth of said plurality of sub cutting teeth at each one of said four corner portions; and said plurality of corner teeth are provided adjacent to each one of said plurality of sub cutting teeth.

9. The cutting insert of claim 6, wherein:

said cutting insert has a seat face; and said corner tooth has an outer edge whose height from the seat face is lower than a height of an outer edge of said sub cutting tooth from the seat face.

10. The cutting insert of claim 1, wherein said horning angles of said corner tooth gradually increase from said horning angle $\alpha$ of said main cutting tooth toward said maximum horning angle $\gamma1$ on a main cutting tooth side and from said honing angle $\beta$ of said sub cutting tooth toward said maximum horning angle $\gamma1$ on a sub cutting tooth side.

11. The cutting insert of claim 4, wherein said height of said sub cutting tooth is gradually decreases toward said height of each of said corner teeth in a section therebetween.

12. The cutting insert of claim 6, wherein said horning angles of said corner teeth gradually increase from said homing angle $\alpha$ of said main cutting teeth toward said maximum homing angle $\gamma1$ on a main cutting teeth side and from said honing angle $\beta$ of said sub cutting teeth toward said maximum homing angle $\gamma1$ on a sub cutting teeth side.

* * * * *